United States Patent [19]

Estrada

[11] 4,325,570
[45] Apr. 20, 1982

[54] IDENTIFICATION SYSTEM

[76] Inventor: Carlos I. Estrada, 3540 City Terrace Dr., Los Angeles, Calif. 90063

[21] Appl. No.: 146,484

[22] Filed: May 5, 1980

[51] Int. Cl.³ .................. B42D 15/00; G06K 9/00
[52] U.S. Cl. ......................... 283/7; 33/1 BB
[58] Field of Search ............. 283/7, 9 R, 9 A; 340/146.3 E; 33/1 BB, 1 S; 427/1; 118/31.5

[56] References Cited

U.S. PATENT DOCUMENTS

| | | | |
|---|---|---|---|
| 2,048,879 | 7/1936 | Moran | 33/1 BB |
| 3,419,287 | 12/1968 | Rudie | 283/7 |
| 3,694,240 | 9/1972 | Miller | 283/7 X |
| 3,959,884 | 6/1976 | Jordan et al. | 283/7 |
| 4,229,023 | 10/1980 | Luz | 283/7 |
| 4,260,646 | 4/1981 | Farrell | 283/7 X |

Primary Examiner—Paul A. Bell
Assistant Examiner—John S. Brown
Attorney, Agent, or Firm—Charles T. Silberberg

[57] ABSTRACT

An identification system for individuals which provides a three point identification check at point-of-transaction to assure accuracy is disclosed. The system utilizes an individual fingerprint and an identifier which can be correlated to the fingerprint and to a listing of valid identifiers. In carrying out the system, an identification card is used which has the individual's fingerprint, a grid superimposed over the fingerprint, and an identifier printed thereon. The identifier is made-up of a series of individual designations or symbols, with each individual designation representing a selected fingerprint characteristic in respective squares of the grid. A data bank for individuals in the system contains a listing of valid identifiers for correlation and validation purposes. The identifier may be made up of alpha, numeric, or alpha numeric designations.

7 Claims, 2 Drawing Figures

IDENTIFICATION SYSTEM

BACKGROUND OF THE INVENTION

A. Field of the Invention

This invention relates to an identification system. More particularly, the invention relates to an identification system employing fingerprints which provides a three point check for identifying an individual to assure accuracy.

B. Statement of the Prior Art

Fingerprints are well known as a form of individual identification. However, while fingerprints can be compared to determine their correlation, this information must be combined with other checks to assure proper identification, i.e., associating the fingerprint with the name or other identifying indication for an individual. This is particularly important in areas where counterfitting and fraud are problems, such as in alien and welfare identification cards, and social security and check cashing identification.

It has been known in the prior art to employ fingerprints on identification cards, but not as a system that provides, at point-of-transaction, correlation of: I.D. card, I.D. card holder, and data bank. It is also known to classify fingerprints by various classification systems, which generally are based on the Henry system. A fingerprint classification by coordinate system is disclosed in U.S. Pat. No. 3,419,287 to Rudie. U.S. Pat. No. 2,048,879 to Moran discloses a means of transmitting fingerprint characteristics wherein a grid is superimposed over a fingerprint and various characteristics in some of the grid-squares noted. In this manner, identification of a fingerprint can be made without having the fingerprint in question available for visual comparison. Thus, according to the Moran invention, various characteristics are selected from the fingerprint with their location on the grid being listed. The characteristics listed are not disclosed to be set forth in any specific order, nor are any identifiers assigned to the characteristics themselves.

SUMMARY OF THE INVENTION

It is, therefore, an object of the present invention to provide a simple, inexpensive, and highly accurate identification system.

It is another object of the present invention to provide an identification system for individuals having a three point identification check.

It is yet another object of the present invention to provide an identification card providing various information thereon, such that a three point identification check may be utilized.

It is still another object of the present invention to provide a method of identification utilizing an individual's fingerprint which offers a three point identification check.

Briefly, in accordance with the invention, there is provided an identification card comprising a base, a fingerprint on the base, a grid superimposed on the fingerprint, and an identifier printed on the base. The identifier is a series of individual designations, each representing a fingerprint characteristic. Different individual designations represent different fingerprint characteristics. The individual designation of the series are in an order corresponding to an order of the grid-squares. Thus, each designation represents a selected fingerprint characteristic in the respective grid-squares.

Also, in accordance with the present invention, a method of identification is carried out by assigning a series of designations to selected fingerprint characteristics, with a different designation for each characteristic. A fingerprint for a given individual is imprinted and a grid superimposed thereon. The fingerprint and superimposed grid are printed on a card. A position number for each grid-square is assigned along with an order for the position numbers. An identifier is generated for the individual corresponding to the fingerprint by selecting a fingerprint characteristic in each of the grid-squares, assigning the corresponding designation from the series of designations to the characteristic, and arranging the corresponding designation in the order of the position numbers. The identifier is provided in a listing of valid identifiers. This allows the individual to be identified with a three point identification check by comparing a new fingerprint of the individual to the fingerprint on the card, comparing the fingerprint on the card to the indentifier, and confirming that the identifier is valid by determining if it is included in the listing.

Other objects and advantages of the invention will become apparent upon reading the following detailed description and upon reference to the drawing.

While the invention will be described in connection with the preferred embodiment, it will be understood that it is not intended to limit the invention to that embodiment. On the contrary, it is intended to cover all alternatives, modifications, and equivalents which may be included within the spirit and scope of the invention as defined by the appended claims.

DETAILED DESCRIPTION OF THE INVENTION

Figure 1:
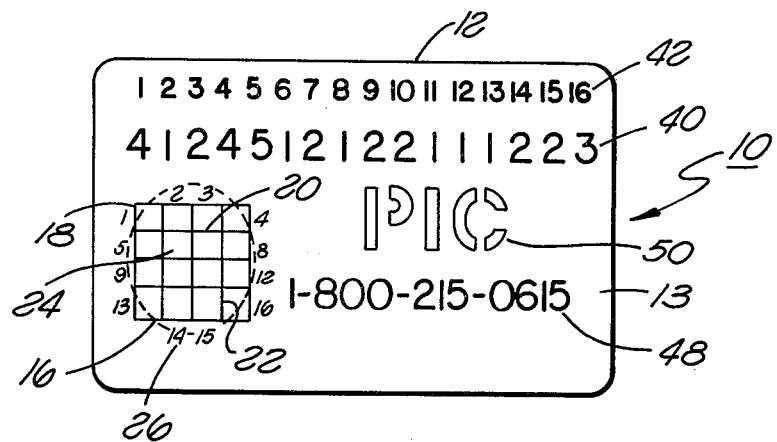
FIG. 1 is a top plan view of an identification card according to the present invention.

Referring now to FIG. 1, there is seen an identification card, generally indicated at 10, in accordance with the present invention. Identification card 10 is comprised of a base 12, in the form of a strip of plastic or other suitable material. On the upper major surface 13 of base 12 is printed an individual's fingerprint 16, which is diagrammaticaly illustrated by broken lines, and a grid 18 which is superimposed over fingerprint 16. Grid 18 is preferably square in shape and formed by a number of horizontal parallel lines 20 and intersecting vertical lines 22, such that a plurality of squares 24 are formed. In the preferred embodiment, grid 18 would be formed of sixteen grid-squares 26. Indicia, in the form of numbers 26, are printed on the sides of grid 18 to identify the various squares 24 of grid 18. Thus, each square 24 is identified by one different number of numbers 26. Numbers 26 constitute a position number for each square 24 of grid 18. Position numbers 26 are selected to increase by one unit for each succeeding number such that for the sixteen squares 24, there will be sixteen position numbers 26 running from one to sixteen. In this manner, each of the position numbers (and squares 24) is assigned an order, i.e., one comes before two, which comes before three, etc.

Figure 2:
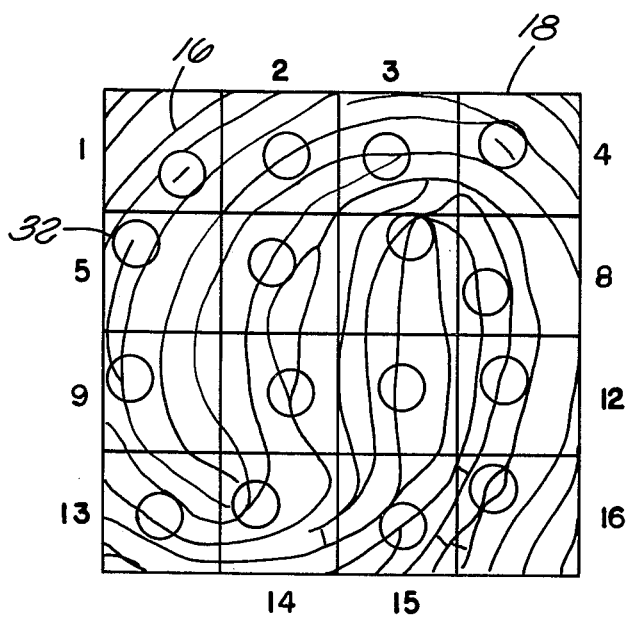
FIG. 2 is a greatly enlarged fragmentary plan view of the fingerprint and superimposed grid of the identification card shown in FIG. 1.

Referring now to FIG. 2, there is shown a greatly enlarged illustration of fingerprint 16 and grid 18. In order to practice the present invention, a fingerprint 16 is taken for an individual to be included in the identification system. This fingerprint is taken in the manner well known in the art. A photograph is taken of the fingerprint, which is enlarged to optimally 8 inch by 10 inch size. An overlay, such as a clear sheet of plastic, with a standard size grid 18 printed thereon, is placed over the enlarged photograph of fingerprint 16. The grid 18 is preferably positioned such that the core of fingerprint 16 is centrally located within the grid 18.

A significant part of the present invention involves the generating of an identifier corresponding to the fingerprint 16 such that the identifier can be compared to the fingerprint to determine their correlation. The identifier is made up of a series of alpha, numeric, or alpha numeric designations or symbols, with each individual designation representing a selected fingerprint characteristic in respective squares of grid 18. Optimally, the identifier will be in the form of an identifying number (however, other symbols such as letters or letter-number combinations could equivalently be used).

In generating the identifying number, a plurality of fingerprint characteristics are selected. A series of numbers is assigned to these characteristics with a different number for each characteristic. An example of this is set forth below:

Example 1

| Number | Fingerprint Characteristic |
| --- | --- |
| 1 | ridge |
| 2 | bifurcation |
| 3 | enclosure |
| 4 | dot |
| 5 | ridge ending |
| 6 | scar or mutilation |
| 7 | ridge crossing |
| 8 | trifurcation |
| 9 | island |
| 0 | none of the above |

Keeping these fingerprint characteristics in mind, such as set forth above in Example 1, a fingerprint characteristic in each of the squares 24 is selected and highlighted such as by enclosing each respective characteristic in a circle 32, which would be marked on the grid overlay. The selection of the particular characteristic in each of the squares 24 is arbitrary, but normally the most note-worthy (unusual) characteristic would be selected. In any event, with sixteen squares 24, and the possible numbers for the different characteristics, there are so many possible combinations of numbers as to make duplication of an identifying number near impossible. With close reference to FIG. 2, it can be seen by examining the various circles 32 in squares 24 that the following characteristics are designated:

| Grid-position number | fingerprint characteristic |
| --- | --- |
| 1 | dot |
| 2 | ridge |
| 3 | bifurcation |
| 4 | dot |
| 5 | ridge ending |
| 6 | ridge |
| 7 | bifurcation |
| 8 | ridge |
| 9 | bifurcation |

-continued

| Grid-position number | fingerprint characteristic |
| --- | --- |
| 10 | bifurcation |
| 11 | ridge |
| 12 | ridge |
| 13 | ridge |
| 14 | bifurcation |
| 15 | bifurcation |
| 16 | bifurcation |

Now, with reference to Example 1 set forth above, utilizing the numbers for the different characteristics and setting them forth in the order of the grid-square position numbers, results in identification number for fingerprint 16 of 4124512122111223. This identification number is indicated at 40 on card 10 of FIG. 1. Preferably, the corresponding grid-square position numbers for identification number 40 would be set forth above number 40, as shown at 42 on card 10 in FIG. 1.

Another photograph is taken of fingerprint 16, this time with the grid 18 and highlighting circles 32 superimposed thereon. This photograph is reduced from the 8 inch by 10 inch size to that suitable for the identification card 10 and transferred to the card in any suitable manner, e.g., lamination or direct photography.

Identifying number 40 is provided in a data bank listing of valid identifying numbers. Typically, such a data bank would be included in a computer. Optionally, a telephone number 48 can be printed on surface 12 of card 10 in order to speak to an individual at the data bank who could advise as to whether the identifying number 40 is in the listing of valid identifying numbers. Also, an agency or company label 50 can be printed on the card 10.

In using the identification system of the present invention, an individual to be placed into the system is provided with an identification card 10 such as described above. Such individual's identification number 40 is provided into the data bank listing of valid identifiers. Later, in order to identify this individual, such as where the individual wants to cash a check, a new fingerprint is taken of the individual. The new fingerprint can then be easily compared to the fingerprint on the card to determine if they match. This represents the first check. The individual's identification card is placed within a device which magnifies the size of fingerprint 18 to make such easily visible. Typically, this would be 8 inch by 10 inch size. An example of such a device is the FC281 Comparator sold by Sirchie Fingerprint Laboratories, Raleigh, N. C. The fingerprint 16 on card 10 can then be compared to the identifying number 40. Thus, with reference to FIGS. 1 and 2, the person making the identification check would determine if in grid-square number one there is highlighted a dot, in grid-square two a ridge, in grid-square three a bifurcation, etc. Normally, only a few grid-squares would have to be checked to determine if there was a match. This represents the second check. As the third check, it would be determined that number 40 is valid by inquiring if the identifier 40 is included in the data bank which lists valid identifiers.

As can be seen from the above, a quick, simple, and inexpensive identification system is provided that utilizes a three point check at point-of-transaction. The advantage of the three point check is that counterfitting becomes extremely difficult. Thus, with the second check it is determined that the fingerprint on the card is the correct one, by virtue of its correlation to identifier 40. With the first check, it is further determined that the card correlates with the person presenting it. With the last check, it is determined that the card is a valid one.

Thus, it is apparent that there has been provided, in accordance with the invention, an identification system that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations which fall within the spirit and scope of the appended claims.

I claim:

1. An identification card comprising:
   a base;
   a fingerprint on said base;
   a grid made up of a plurality of squares arranged in rows and columns superimposed over said fingerprint; and
   an identifier imprinted on said base, said identifier being a series of individual symbols, each individual symbol representing a fingerprint characteristic, with different individual symbols representing different fingerprint characteristics, said individual symbols of said series being arranged in an order corresponding to a preselected order of said squares of said grid, each of said individual symbols representing a selected fingerprint characteristic appearing in the respective square of said grid, whereby a comparison for identity can be made between said identifier and said fingerprint.

2. The identification card of claim 1 wherein said symbols are numbers.

3. The identification card of claim 2 also including indicia for designating the order of said squares of said grid.

4. The identification card of claims 1, 2, or 3 wherein said fingerprint has its core centrally located relative to said grid.

5. A method of identification comprising the steps of:
   assigning a series of symbols to selected fingerprint characteristics, a different symbol for each characteristic;
   imprinting a selected fingerprint for a given individual;
   superimposing a grid made up of a plurality of squares arranged in rows and columns on said fingerprint;
   imprinting said fingerprint with said grid superimposed on a card;
   assigning a position number for each square of said grid;
   assigning an order to said position numbers;
   generating an identifier for said individual corresponding to said fingerprint by selecting a fingerprint characteristic in each of said squares, assigning the corresponding symbol to said characteristic, and arranging said corresponding symbols in the order of said position numbers;
   imprinting said identifier on said card;
   taking a new fingerprint corresponding to said selected fingerprint of said individual when said individual is to be identified;
   comparing said new fingerprint to said fingerprint on said card; and
   comparing said fingerprint on said card to said identifier on said card.

6. The method of claim 5 also including the steps of:
   providing said identifier in a listing of valid identifiers; and
   confirming that said identifier on said card is valid by determining if said identifier on said card is included in said listing.

7. The method of claims 5 or 6 wherein said symbols are numbers.

* * * * *